(12) United States Patent
Cambruzzi et al.

(10) Patent No.: US 11,167,956 B2
(45) Date of Patent: Nov. 9, 2021

(54) METHOD FOR MOUNTING AND ALIGNMENT DEVICE FOR ALIGNING A GUIDE RAIL OF AN ELEVATOR SYSTEM

(71) Applicant: Inventio AG, Hergiswil (CH)

(72) Inventors: Andrea Cambruzzi, Zurich (CH); Erich Bütler, Ebikon (CH); Philipp Zimmerli, Härkingen (CH); Raphael Bitzi, Lucerne (CH); Philipp Renner, Meierskappel (CH)

(73) Assignee: INVENTIO AG, Hergiswil (CH)

( * ) Notice: Subject to any disclaimer, the term of this patent is extended or adjusted under 35 U.S.C. 154(b) by 230 days.

(21) Appl. No.: 16/346,147

(22) PCT Filed: Nov. 9, 2017

(86) PCT No.: PCT/EP2017/078746
§ 371 (c)(1),
(2) Date: Apr. 30, 2019

(87) PCT Pub. No.: WO2018/095739
PCT Pub. Date: May 31, 2018

(65) Prior Publication Data
US 2020/0055709 A1  Feb. 20, 2020

(30) Foreign Application Priority Data

Nov. 24, 2016  (EP) .................................. 16200415

(51) Int. Cl.
*B66B 19/00* (2006.01)
*G01B 5/25* (2006.01)

(52) U.S. Cl.
CPC .............. *B66B 19/002* (2013.01); *G01B 5/25* (2013.01)

(58) Field of Classification Search
CPC ................................ B66B 19/002; G01B 5/25
See application file for complete search history.

(56) References Cited

U.S. PATENT DOCUMENTS

2016/0084649 A1  3/2016  Yamazaki et al.

FOREIGN PATENT DOCUMENTS

| CN | 1336899 A | 2/2002 | |
|---|---|---|---|
| CN | 1350975 A | 5/2002 | |
| DE | 1223115 B * | 8/1966 | ........... B66B 19/002 |
| EP | 0905080 A2 * | 3/1999 | ........... B66B 19/002 |
| EP | 2821358 A1 | 1/2015 | |
| GB | 865499 A | 4/1961 | |
| JP | S53119542 A | 10/1978 | |
| JP | 01133882 A * | 5/1989 | ........... B66B 19/002 |
| JP | 01252482 A * | 10/1989 | ........... B66B 19/002 |
| JP | 03124683 A * | 5/1991 | ........... B66B 19/002 |

(Continued)

*Primary Examiner* — Minh Truong
(74) *Attorney, Agent, or Firm* — William J. Clemens; Shumaker, Loop & Kendrick, LLP

(57) ABSTRACT

A method for mounting and aligning a guide rail in an elevator shaft of an elevator system, which elevator shaft primarily extends in a main extension direction, includes at least the following steps: securing a rail bracket base to a shaft wall of the elevator shaft; applying a mark to the rail bracket base; aligning the guide rail in relation to the mark; and securing the guide rail to the shaft wall using the rail bracket base. The alignment of the guide rail is carried out by an alignment device that includes an abutment part and a location device.

12 Claims, 4 Drawing Sheets

(56) References Cited

FOREIGN PATENT DOCUMENTS

| | | | | |
|---|---|---|---|---|
| JP | 03152077 A | * | 6/1991 | ........... B66B 19/002 |
| JP | H0624667 A | | 2/1994 | |
| JP | 08310767 A | * | 11/1996 | ........... B66B 19/002 |
| JP | 09110334 A | * | 4/1997 | ........... B66B 19/002 |
| JP | H1087225 A | | 4/1998 | |
| JP | 2004043139 A | * | 2/2004 | ........... B66B 19/002 |
| WO | WO-0194884 A1 | * | 12/2001 | ........... B66B 19/002 |
| WO | 2015091419 A1 | | 6/2015 | |
| WO | 2017016781 A1 | | 2/2017 | |
| WO | 2017016783 A1 | | 2/2017 | |

* cited by examiner

METHOD FOR MOUNTING AND ALIGNMENT DEVICE FOR ALIGNING A GUIDE RAIL OF AN ELEVATOR SYSTEM

FIELD

The invention relates to a method for mounting a guide rail in an elevator shaft of an elevator system, which elevator shaft primarily extends in a main extension direction, and to an alignment device for aligning a guide rail in an elevator shaft of an elevator system, which elevator shaft primarily extends in a main extension direction.

BACKGROUND

Elevator cars and optionally associated counterweights of an elevator system are guided by so-called guide rails in operation, i.e. during journeys in an elevator shaft. The guide rails are conventionally secured to a shaft wall of the elevator shaft by means of a rail bracket base, a rail bracket upper part, and so-called rail clips. For this purpose, the rail bracket base is conventionally first secured to the shaft wall by means of screws, for example, and the guide rail is fastened to the rail bracket upper part by means of the rail clips. The guide rail is then aligned and the rail bracket base is firmly screwed to the rail bracket upper part in the position produced by alignment.

Correct mounting and in particular precise alignment of the guide rails is very important for the travel comfort of the elevator cars. In this connection, aligning a guide rail is intended to be understood to mean both the correct position in the elevator shaft and the position in relation to potentially adjacent guide rails. The exact alignment of guide rails is also important in particular because it can only be corrected with a high degree of effort, if at all, after all the necessary guide rails of an elevator system have been secured.

When the guide rails are mounted, a guide rail is usually first fully mounted, including alignment, and mounting of the following guide rail is then initiated. In order to be able to align the guide rails, reference elements, for example in the form of guide lines, are usually tensioned in the elevator shaft, in relation to which elements the guide rails must be aligned. A method of this kind is described in WO 2015/091419 A1, for example. The guide rails can therefore be aligned precisely. However, mounting and alignment is fairly time-consuming, as various working steps often have to be carried out using different tools. In addition, the reference elements may be at a considerable spacing from the guide rail, which spacing has to be bridged in a complex manner.

For efficient mounting of guide rails, it may be advantageous if the guide rails are not fully mounted one after the other, but, for example, only all the necessary rail bracket bases are first secured to the shaft walls and only thereafter are the guide rails aligned and mounted one after the other. This is in particular the case if the rail bracket bases are secured at least partially automatically, for example using a mounting device according to WO 2017/016783 A1.

The reference elements tensioned in the elevator shaft can interfere with the mounting of the guide rails. In addition, there is the risk that the position of the reference elements is changed while the guide rails are being mounted, thus leading to incorrect alignment of the guide rails and therefore ultimately to poor travel comfort and greater wear to the elevator car.

JPH 0624667 A describes a method and an alignment device for aligning a guide rail of an elevator system, in which the guide rail is aligned in relation to reference elements tensioned in the elevator shaft.

JPS 53119542 A describes a method and an alignment device for aligning a guide rail of an elevator system, in which the guide rail is aligned in relation to a laser beam.

SUMMARY

In contrast, an object of the invention is in particular that of proposing a method and an alignment device which allow efficient and yet precise mounting and alignment of guide rails in an elevator shaft.

The method according to the invention for mounting a guide rail in an elevator shaft of an elevator system, which elevator shaft primarily extends in a main extension direction, includes at least the following steps: securing a rail bracket base to a shaft wall of the elevator shaft; applying a mark to the rail bracket base; aligning the guide rail in relation to said mark; and securing the guide rail to the shaft wall via the rail bracket base. Securing in this manner is carried out, for example, by screwing the rail bracket base to a rail bracket upper part to which the guide rail is fastened by means of rail clips. By applying said mark, in relation to which the guide rail is aligned, reference elements tensioned in the elevator shaft are not necessary when the guide rail is aligned. There is therefore more space in the elevator shaft during alignment and there is no risk of the position of the reference elements being inadvertently changed. Furthermore, the marks, in relation to which the guide rails are aligned, are not at a great distance from the guide rail. All the elements necessary for alignment are therefore arranged close together, which allows easy handling.

In this case, the main extension direction of the elevator shaft should be understood to mean the direction in which an elevator car of the fully mounted elevator system is moved. The main extension direction therefore extends in particular vertically, but can also extend so as to be inclined with respect to the vertical, or can extend horizontally. In this case, the main extension direction does not necessarily need to extend along a single straight line over the entire length of the elevator shaft. It is also possible, for example, for the course of the main extension direction to be composed of straight sections, the transition regions of which may also be rounded.

The mark on the rail bracket base marks in particular a position that is transverse to the main extension direction of the elevator shaft. The rail bracket base therefore comprises at least one component which extends away from the shaft wall into the elevator shaft.

The rail bracket base is secured to the shaft wall by means of screws or so-called anchor bolts, for example. The rail bracket upper part is connected, e.g. screwed, to the rail bracket base. In this case, connecting, i.e. in particular screwing, is carried out such that the two rail bracket parts can be interconnected in various alignments, in particular transversely to the main extension direction. Said various alignments of the two rail bracket parts allows alignment of the guide rail. The names "rail bracket base" and "rail bracket upper part" are not intended to express orientation of the two parts with respect to one another. The names are merely intended to ensure a clear distinction between the two parts.

The guide rail can also be secured by means of other components. In order that the method according to the invention can be carried out, it is only relevant that a rail bracket base is secured to a shaft wall and the position of the guide rail in relation to the rail bracket base can be changed.

The mark on the rail bracket base may be applied, for example, using a pen, a scriber, a drill, a milling tool, a powerful laser or by means of an electric engraving tool.

Two mutually spaced points are in particular marked by means of the mark, the two points being in particular spaced transversely to the main extension direction of the elevator shaft. A connecting line between the two points primarily extends in particular in parallel with the shaft wall to which the rail bracket base is secured. This allows particularly precise alignment of the guide rail.

The mark can consist of two separate dots or crosses, for example. It is also possible that the mark is a line, the ends of which indicate said two points. In this case, it is also possible that additional mark elements, such as additional lines, are also arranged at said ends. Moreover, hybrid forms of said embodiments and other marks which are considered to be expedient by a person skilled in the art are also conceivable.

The guide rail is aligned in relation to the mark on the rail bracket base in particular by means of an alignment device, which is configured to align the guide rail in relation to a mark on a rail bracket base secured to a shaft wall of the elevator shaft. The alignment device comprises in particular an abutment part having a recess, which has a complementary shape to a running surface of the guide rail. The alignment device also comprises in particular a location device, which is designed and arranged such that the abutment part, and therefore the guide rail, can be brought into a defined position in relation to a mark on a rail bracket base secured to a shaft wall of the elevator shaft. This allows particularly precise and simultaneously easy alignment of the guide rail.

The location device of the alignment device comprises in particular at least one laser. In this case, the abutment part is positioned in relation to said mark, and the guide rail is therefore aligned, such that a laser beam of the laser is aligned with respect to the mark on the rail bracket base. This allows particularly precise and simultaneously easy alignment of the guide rail. The location device comprises in particular two lasers, such that in order to position the abutment part, the laser beam of the first laser is directed towards a first point and the laser beam of the second laser is directed towards a second point of the mark on the rail bracket base.

The location device may also comprise one or two locating rods, which extend analogously to said laser beams. The guide rail is therefore aligned such that a tip of one locating rod or the tips of two locating rods are aligned with respect to the mark on the rail bracket base.

In an embodiment of the invention, a position of the mark is determined on the basis of at least one, in particular two, reference elements arranged in the elevator shaft. The reference elements are in particular designed as cords which are tensioned in the elevator shaft primarily in the main extension direction. By applying the marks to the rail bracket bases on the basis of the reference elements, the position of the reference elements in the elevator shaft is more or less transferred to the rail bracket bases. The reference elements can therefore be removed after the rail bracket bases have been secured to the shaft wall. The position of the mark in relation to the reference element(s) can be determined by means of a suitable template, for example.

In an embodiment of the invention, the mark is applied to the rail bracket base by means of a mechatronic installation component of a mounting device for carrying out an installation process in an elevator shaft. In this case, the installation component is in particular designed such that it can also carry out other mounting steps in the elevator shaft, such as securing the rail bracket bases to the shaft wall. When a mounting step is carried out in an elevator shaft, a mounting device must know exactly its position in the elevator shaft. As described above, said device can determine this position, for example, on the basis of a digital model of the elevator shaft or of the elevator system, or on the basis of one or more reference elements in the elevator shaft. A method for determining the position on the basis of one or more reference elements is described, for example, in the non-prepublished European patent application from the applicant having the serial number EP16163399.5 (see WO 2017/167719 A1). Based on the known position of the mounting device in the elevator shaft and a specification of the desired course of the guide rails, the position of the mark on the rail bracket bases can be determined and the mark can be applied in a simple manner. Applying the mark, and therefore also aligning and mounting the guide rails, can therefore be carried out particularly easily and cost-effectively.

In an embodiment of the invention, two opposing guide rails are aligned. The two opposing guide rails can be aligned in particular at the same time. It is also possible that first one of the two guide rails is aligned and subsequently the second, opposing guide rail is aligned. By aligning the second guide rail, in particular the alignment of the first guide rail can be checked and corrected if necessary. However, the second, opposing guide rail is always aligned before a further guide rail which is connected to the first guide rail. In this case, each guide rail is oriented in relation to the mark on the rail bracket base associated therewith in each case. An elevator car is typically guided on two opposing guide rails during operation. The travel comfort therefore depends on the alignment of the two guide rails and in particular on the alignment of the guide rails with respect to one another. The described alignment of two opposing guide rails can also allow precise alignment of the guide rails with respect to one another.

The two opposing guide rails are aligned in relation to the mark on the rail bracket base associated with each guide rail in particular by means of an alignment device in each case, which devices are connected by means of a cord. In order to ensure the correct alignment of the two guide rails with respect to one another, a correct course of said cord is checked. In addition, one or both alignment devices may comprise an elongate verification mark, for example in the form of a groove or a slot, over which the cord must extend when the two guide rails are correctly aligned with respect to one another. It is therefore possible to check the correct alignment of the two guide rails with respect to one another in a particularly simple and reliable manner.

In an embodiment of the invention, the spacing between the two opposing guide rails in particular transversely to the main extension direction of the elevator shaft is checked. In order to be able to guide the elevator car correctly, the guide rails must be at a predetermined spacing. Checking this spacing allows a high level of travel comfort of the elevator car.

The spacing mentioned can be checked by means of a so-called track gauge, for example. The track gauge is a rod having a defined length which corresponds to the desired spacing of the guide rails.

The above-mentioned problem is also solved by an alignment device for aligning a guide rail in an elevator shaft in an elevator system, which elevator shaft primarily extends in a main extension direction, which device is configured to align the guide rail in relation to a mark on a rail bracket base secured to a shaft wall of the elevator shaft. The alignment device comprises in particular an abutment part and a location device. The alignment device allows particularly precise and simultaneously easy alignment of the guide rail.

The abutment part has a recess, which has a complementary shape to a running surface of the guide rail.

A guide rail comprises in particular a bottom and a web, which are arranged in a T-shape with respect to one another. The guide rail is arranged in the elevator shaft such that the bottom of the guide rail abuts the rail bracket upper part at least directly, i.e. is oriented in the direction of the shaft wall. The web is therefore oriented in the direction of the elevator shaft. Said web has a machined running surface of the guide rail, which surface consists of three partial running surfaces in total. Said surface consists of a front partial running surface, which primarily extends in parallel with the shaft wall, and two lateral partial running surfaces connected to the front partial running surface. The complementary shape of the recess of the abutment part of the alignment device corresponds to a plane that is transverse to the main extension direction of the elevator shaft. In this case, the recess does not need to be designed such that it can completely accommodate all three partial running surfaces. It is particularly important that the recess is designed such that the abutment part can be arranged in relation to the guide rail such that the guide rail extends through the recess and the abutment part abuts the complete front partial running surface and at least parts of the lateral partial running surface, and therefore a defined position of the abutment part and therefore of the alignment device in relation to the running surface of the guide rail and therefore in relation to the entire guide rail is specified.

The location device is designed and arranged such that the abutment part can be brought into a defined position in relation to a rail bracket base secured to a shaft wall of the elevator shaft. The location device comprises in particular at least one or two lasers for this purpose. In this case, the laser or lasers is/are arranged on the location device such that the guide rail is correctly aligned when a laser beam emitted by the laser is aligned in relation to the mark on the rail bracket base in a predetermined manner. The alignment is correct in particular when the laser beams of two lasers are exactly aligned with respect to two mutually spaced points of the mark on the rail bracket base. This can be controlled particularly easily, thus allowing particularly easy and simultaneously precise alignment of the guide rails.

Instead of one or two lasers, the location device may also comprise in particular one or two locating rods, which extend analogously to said laser beams. The locating rods can be designed as metal or plastics pins having a tip, for example. The guide rail is therefore aligned such that the tip of one locating rod or the tips of two locating rods are aligned with respect to the mark on the rail bracket base. For precise positioning, the location device can be moved along the guide rail, for example. It is also possible that the locating rods can be moved primarily in the main extension direction of the elevator shaft in relation to the location device. The location device is therefore particularly precise and does not require an energy source, for example in the form of a battery. It is also very robust, which is highly advantageous for use on a construction site.

In an embodiment of the invention, the arrangement of the abutment part can be adjusted with respect to the location device. The alignment device can therefore be adapted to various conditions and can therefore be used universally. In this case, a spacing of the recess of the abutment part and of the location device can be set in a direction primarily perpendicularly to the abutment surface for the front partial running surface of the guide rail of the abutment part. The spacing required in this case can vary in different elevator systems.

In an embodiment of the invention, the alignment device comprises an elongate verification mark. The verification mark is designed such that a correct course of a cord fastened to the alignment device can be checked. When the alignment device in the elevator shaft rests correctly on the guide rail, the verification mark extends in particular primarily perpendicularly to the shaft wall. The cord connects in particular two alignment devices whilst simultaneously aligning two opposing guide rails. The two opposing guide rails can therefore be checked in a simple and effective manner.

Further advantages, features and details of the invention are set out in the following description of embodiments and in the drawings, in which identical or functionally identical elements are provided with the same reference signs.

DETAILED DESCRIPTION

Figure 1:
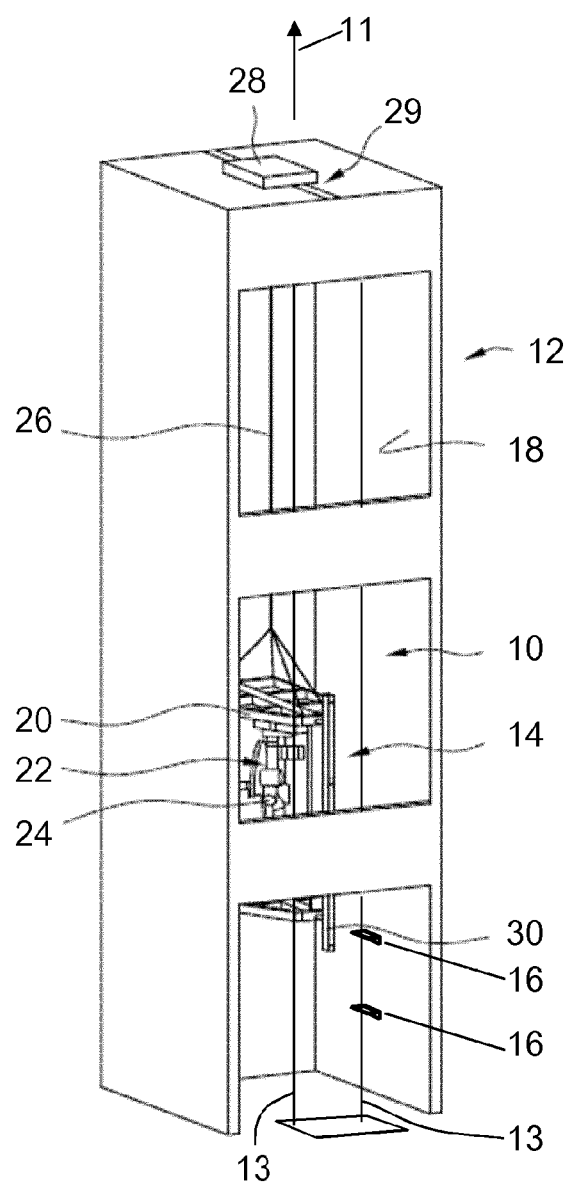
FIG. 1 is a perspective view of an elevator shaft of an elevator system with a mounting device accommodated therein.

FIG. 1 shows a mounting device 14 arranged in an elevator shaft 10 of an elevator system 12, by means of which device rail bracket bases 16 can be secured to a shaft wall 18. The elevator shaft 10 extends in a main extension direction 11, which is vertical in FIG. 1. In a later mounting step, guide rails (not shown in FIG. 1; reference sign 38 in FIGS. 3 and 4) of the elevator system 12 can be secured to the shaft wall 18 by means of the rail bracket bases 16. The mounting device 14 comprises a carrier component 20 and a mechatronic installation component 22. The carrier component 20 is designed as a frame on which the mechatronic installation component 22 is mounted. Said frame has dimensions that permit the carrier component 20 to be vertically displaced within the elevator shaft 10, i.e. to move to different vertical positions on different stories within a building, for example. In the example shown, the mechatronic installation component 22 is designed as an industrial robot 24 which is attached to the frame of the carrier component 20 so as to be suspended downwardly. In this case, one arm of the industrial robot 24 can be moved relative to the carrier component 20 and, for example, displaced towards the shaft wall 18 of the elevator shaft 10.

The carrier component 20 is connected, via a steel cable acting as a suspension means 26, to a displacement component 28 in the form of a motor-driven cable winch that is attached at the top of the elevator shaft 10 to a stopping point 29 on the ceiling of the elevator shaft 10. By means of the displacement component 28, the mounting device 14 can be moved within the elevator shaft 10 in the main extension direction 11 of the elevator shaft 10, i.e. vertically over the entire length of the elevator shaft 10.

The mounting device 14 further comprises a securing component 30, by means of which the carrier component 20 can be secured within the elevator shaft 10 in the lateral direction, i.e. in the horizontal direction.

Two reference elements 13 in the form of cords are tensioned in the elevator shaft 10 over the entire length thereof, which elements are aligned in the main extension direction 11. The reference elements 13 are attached in the elevator shaft 10 by a technician and provide the reference for alignment and mounting of guide rails of the elevator system 12. When mounted, the guide rails therefore need to extend in parallel with the reference elements 13 and at a specific spacing from the reference elements 13.

Figure 2:
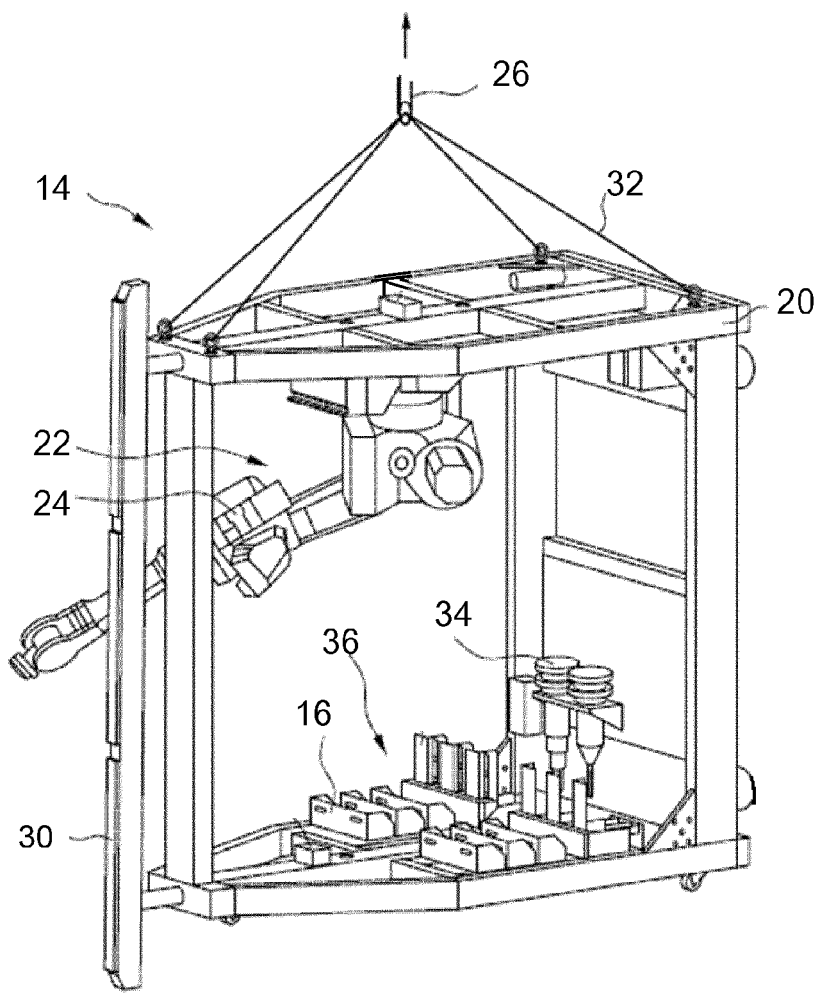
FIG. 2 is a perspective view of a mounting device.

FIG. 2 is an enlarged view of a mounting device 14.

The carrier component 20 is formed as a cage-like frame, in which a plurality of horizontally and vertically extending bars form a mechanically robust structure.

Retaining cables 32 are attached to the top of the cage-like carrier component 20, which cables can be connected to the suspension element 26.

In the embodiment shown, the mechatronic installation component 22 is formed using an industrial robot 24. In the example shown, the industrial robot 24 is equipped with a plurality of robotic arms that are pivotable about pivot axes. The industrial robot may, for example, have at least six degrees of freedom, i.e. a mounting tool 34 guided by the industrial robot 24 can be moved with six degrees of freedom, i.e., for example, with three degrees of rotational freedom and three degrees of translational freedom. The industrial robot can, for example, be designed as a vertical buckling arm robot, a horizontal buckling arm robot, a SCARA robot or a cartesian robot, or as a portal robot.

The unsupported end of the robot can be coupled to different mounting tools 34. The mounting tools 34 may differ in their design and their intended use. The mounting tools 34 can be held on the carrier component 20 in such a way that the unsupported end of the industrial robot 24 can be brought towards said tools or sensors and be coupled to one thereof. For this purpose, the industrial robot 24 can have, for example, a tool changing system which is designed such that it allows at least the handling of a plurality of mounting tools 34 of this kind.

One of the mounting tools 34 is designed as a sensor, for example as a laser scanner, by means of which the relative location of the carrier component 20 in relation to the reference elements 13 can be determined. This can be carried out, for example, using a method which is described in the European patent application from the applicant having the application number EP16163399.5 (see WO 2017/167719 A1). The position of the carrier component 20 in the elevator shaft 10 can be detected from the relative location of the carrier component 20 in relation to the reference elements 13. Based on the position of the carrier component 20, it can be determined at which points of the shaft wall 18 a rail bracket base 16 is to be fastened. Based on the requirement that the mounted guide rails must extend in parallel with the reference elements 13 and at a specific spacing thereto, a position of the mark on the rail bracket base 16 can be determined which is used for orienting the guide rail secured to the rail bracket base 16. The alignment of the guide rail is explained in more detail in conjunction with FIGS. 3 and 4.

The position of the carrier component 20 in the elevator shaft 10 can be determined using a digital model of the elevator system 12. For this purpose, the elevator shaft 10 has to be measured by means of a laser scanner, for example.

One of the mounting tools 34 can be designed as a drilling tool similar to a drilling machine. By coupling the industrial robot 24 to a drilling tool of this kind, the installation component 22 can be designed in such a way that it allows for an at least partially automated controlled drilling of fastening holes in one of the shaft walls 18 of the elevator shaft 10. In this case, the drilling tool may be moved and handled by the industrial robot 24 in such a way that the drilling tool, using a drill, drills holes at a specified position in the shaft wall 18 of the elevator shaft 10, into which holes fastening elements in the form of screws or screw anchors are later screwed in order to secure rail bracket bases.

A further mounting tool 34 is designed as a screwdriver in order to screw, at least partially automatically, screw anchors or screws into previously drilled fastening holes in the shaft wall 18 of the elevator shaft 10.

A further mounting tool 34 is designed as a gripping means, in order to at least partially automatically fasten a rail bracket base 16 to the shaft wall 18.

A further mounting tool 34 is designed as a marking tool, for example in the form of a milling tool, in order to apply a mark (68 in FIG. 4) to a rail bracket base 16. This mark is used for aligning the guide rail secured to the rail bracket base 16.

A magazine component 36 can furthermore be provided on the carrier component 20. The magazine component 36 can be used to store rail bracket bases 16 to be installed and to provide the installation component 22. The magazine component 36 can also be used to store and provide screw anchors or screws which can be driven into prefabricated fastening holes in the shaft wall 18 by means of the installation component 22.

In the example shown, the industrial robot 24 can, for example, automatically grasp a screw from the magazine component 36 and, for example, screw it into previously drilled fastening holes in the shaft wall 18 using a mounting tool 34 designed as a screwdriver. Subsequently, a mounting tool 34 can be exchanged on the industrial robot 24 and, for example, a rail bracket base 16 can be gripped from the magazine component 36. The rail bracket base 16 comprises fastening slots. If the rail bracket base 16 is brought into an intended position by means of the installation component 22, the previously partially screwed-in screws can engage in said fastening slot or extend therethrough. Subsequently, the mounting tool 34 designed as a screwing device can be reconfigured in turn and the screws are tightened. The rail bracket bases 16 can be designed in particular in the same way as the elevator part holders described in the international patent application from the applicant having the application number PCT/EP2016/065244 (see WO 2017/016781 A1). The rail bracket bases 16 can be fastened in particular in accordance with the method described in the above-mentioned international patent application.

After a rail bracket base 16 has been fastened or secured to the shaft wall 18 of the elevator shaft 10, the mounting tool 34 designed as a marking tool can be reconfigured and a mark in the form of two crosses can be applied to the rail bracket base 16.

In this way, all the rail bracket bases 16 of the elevator system 12 are fastened to the shaft walls 18 of the elevator shaft 10 and provided with marks for aligning the guide rails. As soon as all the rail bracket bases 16 are mounted and provided with marks, the reference elements 13 are no longer necessary for aligning the guide rails.

Instead of fastening the rail bracket bases to the shaft walls 18 of the elevator shaft using a mounting device 14 and provided said rail bracket bases with a mark at least partially automatically, as described, this can be carried out manually by a technician.

After all the rail bracket bases 16 have been secured to the elevator shaft walls 18, guide rails are brought into the elevator shaft 10 and secured to the shaft walls 18 by a technician. This is described with reference to FIGS. 3 and 4.

First, a guide rail 38 is temporarily fastened to a shaft wall 18. For this purpose, the guide rail 38 is fastened to a rail bracket upper part 42, which has a primarily L-shaped cross section, by means of rail clips 40 (not described in greater detail). The longer part of the rail bracket upper part 42 rests on a rail bracket base 16, which also has a primarily L-shaped cross section. The rail bracket base 16 is secured to the shaft wall 18 by means of two screws 44. In order to be able to interconnect the two rail bracket parts 16, 42, the rail bracket base 16 has two slots 46 which extend in a line primarily in parallel with the shaft wall 18. The rail bracket upper part 42 also has two slots 48 which extend perpendicularly to the shaft wall 18 in parallel with one another. The slots 46 and 48 are arranged such that in each case an bolt-nut connection 50 can be guided through the slots 46, 48 and the two rail bracket parts 16, 42 can therefore be interconnected. By means of the total of four slots 46, 48, the relative location of the two rail bracket parts 16, 42 with respect to one another can be changed and therefore can be aligned with respect to the guide rail 38 rigidly connected to the rail bracket upper part 42. First, the bolt-nut connections 50 are tightened firmly only to the extent that although the two rail bracket parts 16, 42 are connected, said parts are still movable with respect to one another.

Figure 3:
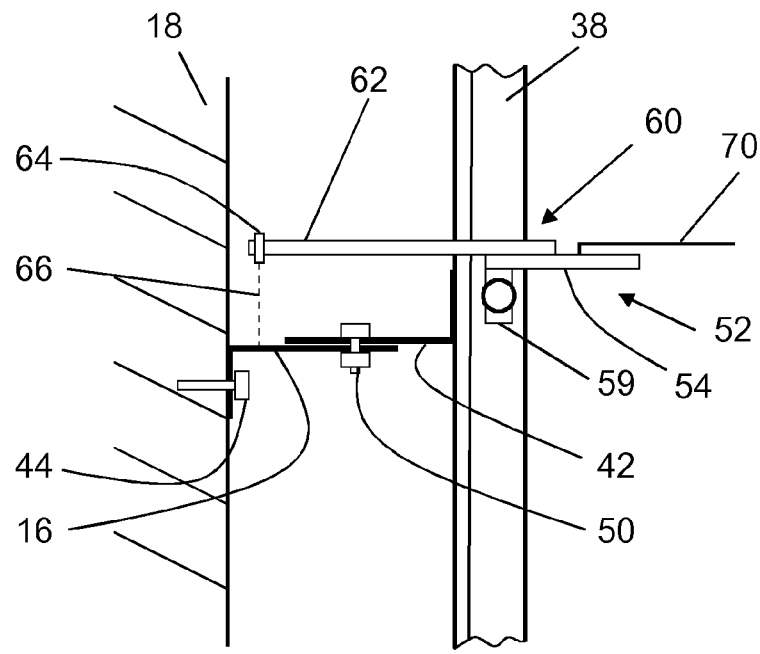
FIG. 3 is a side view of an alignment device arranged on a guide rail.
Figure 4:
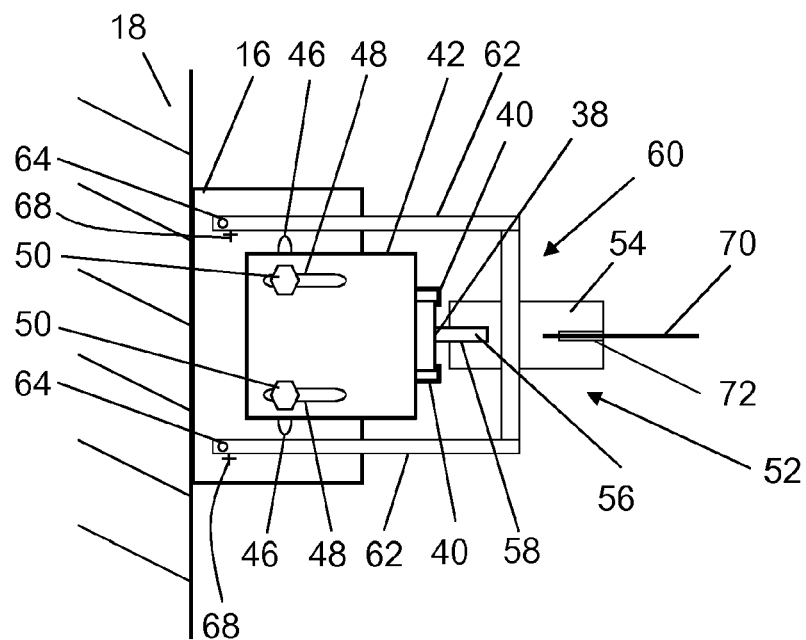
FIG. 4 is a view of the arrangement from FIG. 3 from above.

An alignment device 52 is used for aligning the guide rail 38. The alignment device 52 comprises an abutment part 54, which has a recess 56 for engaging the guide rail 38. The recess 56 has a complementary shape to a running surface 58 of the guide rail 38. The abutment part 54, as shown in FIGS. 3 and 4, can therefore be placed on the guide rail 38 such that the running surface 58 of the guide rail 38 extends through the recess 56 and rests on the edge of the recess 56 with zero backlash. In this state, the abutment part 54, and therefore the alignment device 52, has a defined position in relation to the guide rail 38. In order that this position can be maintained securely, the alignment device 52 comprises a clamping device 59 (shown only schematically) by means of which the alignment device 52 can be firmly clamped to the guide rail 38.

A location device 60 is fastened to the abutment element 54, which location device has a primarily U-shaped cross section with two arms 62. In the clamped position shown of the alignment device 52, the arms 62 extend primarily in parallel with the slots 48 of the rail bracket upper part 42, and protrude beyond the rail bracket upper part 42. A laser 64 is arranged at each of the ends of the arms 62 oriented towards the shaft wall 18, such that it can emit a laser beam 66 towards the rail bracket base 16. Two marks 68 in the form of crosses are arranged on the rail bracket base 16. The marks 68 are positioned such that the guide rail 38 is correctly aligned when the laser beams 66 are aligned precisely with respect to the marks 68. In order to align the guide rail 38, a technician must adjust the position of the rail bracket upper part 42, and therefore of the guide rail 38, in relation to the guide rail bracket base 16 such that the laser beams 66 strike the marks 68 precisely. If this is the case, the technician tightens the bolt-nut connections 50 so firmly that movement between the two rail bracket parts 16, 42 is no longer possible. The guide rail 38 is therefore firmly secured and aligned on the shaft wall 18.

In order to be able to adapt the alignment device 52 to different elevator systems, the location device 60 can be moved towards the two arms 62 with respect to the abutment part 54. The alignment device 52 comprises an adjustment means (not shown in further detail).

Particularly precise alignment of guide rails is achieved when two opposing guide rails 38 are simultaneously aligned and secured to the relevant shaft wall 18 as described. The correct alignment can also be checked in this case.

The two alignment devices 52 are connected by a cord 70 for this purpose. When the two opposing guide rails 38 are correctly aligned, the cord must, in both checking devices 52, extend exactly over an elongate verification mark in the form of a groove 72. This is checked by the technician.

The technician also checks whether the two guide rails are at the correct spacing to one another using what is known as a track gauge (a rod having a defined length). This is the case if the track gauge fits horizontally exactly between the two opposing guide rails.

Figure 5:
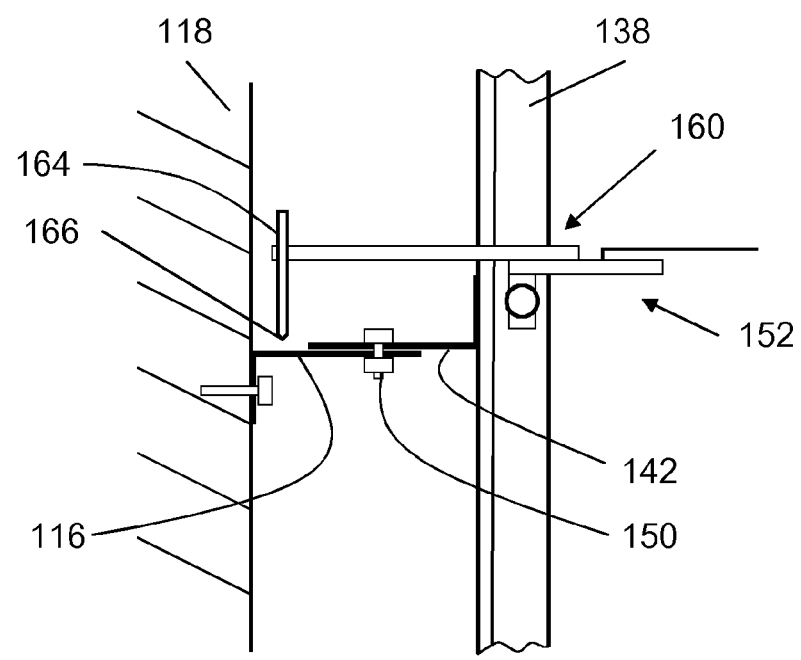
FIG. 5 is a side view of an alternative alignment device arranged on a guide rail.

FIG. 5 shows an alignment device 152 which is an alternative to the alignment device 52 in FIGS. 3 and 4. The alignment device 152 differs only negligibly from the alignment device 52, and therefore only the differences between the two alignment devices are discussed.

A location device 160 of the alignment device 152 comprises two alignment rods 164 and therefore does not comprise a laser like the alignment device 60 from FIGS. 3 and 4. In order to align the guide rail 138, a technician must adjust the position of the rail bracket upper part 142, and therefore of the guide rail 138, in relation to the guide rail base 116 such that tips 166 of the locating rods 164 are precisely aligned with respect to the marks on the rail bracket base 116. If this is the case, the technician tightens the bolt-nut connections 150 so firmly that movement between the two rail bracket parts 116, 142 is no longer possible. The guide rail 138 is therefore firmly secured and aligned on the shaft wall 118.

Finally, it should be noted that terms such as "comprising", "having" etc. do not preclude other elements or steps and terms such as "a/an" or "one" do not preclude a plurality. Furthermore, it should be noted that features or steps that have been described with reference to one of the above embodiments can also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for mounting a guide rail in an elevator shaft of an elevator system, which elevator shaft primarily extends in a main extension direction, comprising the following steps:
   securing a rail bracket base to a shaft wall of the elevator shaft;
   determining a position of the mark based on at least one reference element arranged in the elevator shaft;
   applying a mark to the rail bracket base;
   aligning the guide rail in relation to the mark;
   securing the guide rail to the shaft wall with the rail bracket base; and aligning the guide rail in relation to the mark using an alignment device, the alignment device including an abutment part having a recess with a complementary shape to a running surface of the guide rail, and a location device fastened to the abutment part such that the abutment part along with the guide rail extending through the recess can be brought into a defined position when the location device is in alignment with the mark on the rail bracket base.

2. The method according to claim 1 including applying the mark at two spaced apart points on the rail bracket base.

3. The method according to claim 1 wherein the reference element extends in the main extension direction of the elevator shaft.

4. The method according to claim 1 including applying the mark to the rail bracket base using a mechatronic installation component of a mounting device for carrying out an installation process in the elevator shaft.

5. The method according to claim 1 wherein the guide rail is a first guide rail and including aligning a second guide rail opposed to the first guide rail in relation to another mark on another rail bracket base associated with the second guide rail.

6. The method according to claim 5 including aligning each of the first and second guide rails in relation to the mark and the another mark respectively using an associated alignment device, the associated alignment devices being connected by a cord, each of the alignment devices having a verification mark and including checking that the cord extends over the verification marks to confirm the alignment of the first and second guide rails.

7. The method according to claim 5 including checking a spacing between the first and second guide rails.

8. An alignment device for aligning a guide rail in an elevator shaft of an elevator system, which elevator shaft primarily extends in a main extension direction, comprising: the alignment device being adapted to align the guide rail in relation to a mark on a rail bracket base secured to a shaft wall of the elevator shaft when the alignment device is placed on the guide rail, a position of the mark is determined based on at least one reference element arranged in the elevator shaft, the alignment device including means for engaging the guide rail, wherein the means for engaging includes an abutment part having a recess with a complementary shape to a running surface of the guide rail, and wherein the alignment device includes a location device fastened to the abutment part such that the abutment part along with the guide rail extending through the recess can be brought into a defined position when the location device is in alignment with the mark on the rail bracket base.

9. The alignment device according to claim 8 wherein the location device incudes at least one laser for emitting a laser beam towards the rail bracket base for alignment with the mark.

10. The alignment device according to claim 8 wherein the location device includes at least one locating rod for alignment of a tip of the at least one locating rod with the mark.

11. The alignment device according to claim 8 wherein the abutment part is adjustable with respect to the location device.

12. The alignment device according to claim 8 wherein the abutment part includes an elongate verification mark for checking a correct course of a cord fastened to the alignment device.

* * * * *